Lewicki, Jr. et al.

[11] 4,076,867
[45] Feb. 28, 1978

[54] MULTILEVEL EMBOSSING OF FOAMED-SHEET MATERIALS

[75] Inventors: Walter J. Lewicki, Jr., Lancaster; William M. McQuate, Reinholds, both of Pa.

[73] Assignee: Armstrong Cork Company, Lancaster, Pa.

[21] Appl. No.: 554,321

[22] Filed: Feb. 28, 1975

[51] Int. Cl.² ............................................ B05D 5/00
[52] U.S. Cl. ....................................... 427/264; 101/32; 264/321; 264/327; 427/374 R; 427/374 D; 427/398 B; 156/79; 156/209; 156/220; 428/159
[58] Field of Search ............... 428/159, 160; 156/79, 156/219, 220, 221, 272, 282, 204; 264/284, 293, 321, 327, 132, DIG. 65, 134, 135, 137; 101/32; 427/265, 278, 314, 316, 373, 299, 374 R, 374 D, 398 B, 264

[56] References Cited

U.S. PATENT DOCUMENTS

| 3,619,344 | 11/1971 | Wolinski et al. | 156/282 |
| 3,741,851 | 6/1973 | Erb et al. | 156/220 |
| 3,816,233 | 6/1974 | Powers | 428/311 |
| 3,887,409 | 6/1975 | McCreary et al. | 156/220 |
| 3,887,673 | 6/1975 | Lewicki, Jr. | 156/220 |

FOREIGN PATENT DOCUMENTS

| 1,230,378 | 4/1971 | United Kingdom | 428/311 |

Primary Examiner—George F. Lesmes
Assistant Examiner—Stanley S. Silverman

[57] ABSTRACT

The process herein is used for achieving multilevel mechanical embossing of an expanded foam having a fused or cured wear layer in register with a print on the foam. The expansion of the decorative foam and fusion of the wear layer are carried out and then the back of the foam is cooled by back wetting with or without drum cooling. The wear layer is maintained at a high temperature for embossing and is embossed with registry between the embossed pattern and the printed pattern on the foam.

5 Claims, 1 Drawing Figure

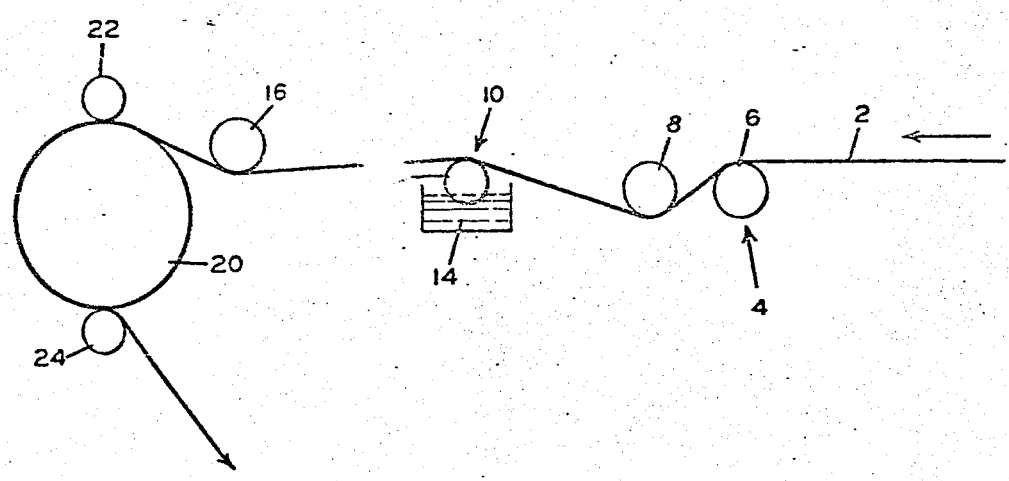

MULTILEVEL EMBOSSING OF FOAMED-SHEET MATERIALS

BACKGROUND OF THE INVENTION

1. Field of the Invention

The invention is directed to a process for manufacturing floor covering material and, more particularly, to a process for the mechanical embossing of a pattern on a floor covering material.

2. Description of the Prior Art

U.S. Pat. No. 3,741,851 discloses a product and process which deals with a foamed vinyl floor covering. A printed color pattern or design is provided between a foam resin layer and a transparent resin layer. Embossing is carried out relative to the transparent resin layer and the embossing is carried out in register with the printed pattern.

U.S. Pat. No. 3,176,058 is directed to an apparatus for embossing sheet material. Water cooling means are provided to cool either one or both sides of the sheet prior to embossing.

U.S. Pat. No. 3,305,419 is directed to an apparatus for embossing a foam backed polyurethane sheet. Surface heating is carried out to heat only the surface to be embossed so that there will be no damage to the underlying foam material.

Finally, U.S. Pat. No. 3,196,062 is directed to a process wherein cooled embossing rolls are utilized to provide an embossed pattern on a sheet material which is composed of a foamable thermoplastic resin base and a thermoplastic resin top coating. Surface heating of the thermoplastic resin is carried out just prior to embossing.

SUMMARY OF THE INVENTION

In the inventive process herein, the expansion of a decorated foam and the fusion of a wear layer thereover are completed in an earlier step in the same manufacturing process in which the embossing is carried out. In other words, the embossing operation is carried out at the end of the processing line which forms the expanded foam product with a fused or cured wear layer. The wear layer is maintained at its high surface temperature while the foamed backing is cooled on its backside by the combination steps of back wetting and drum cooling, or simply by back wetting alone. Appropriate guide structures and controls feed the combination foam layer-wear layer structure into an embossing structure so that the embossing pattern will be placed on the combination wear layer-foam layer structure in registry with the printed design on the surface of the decorated foam. Due to the back wetting and/or cooling, there will be a 100° F. to 150° F. difference between the surface of the wear layer being embossed and the back surface of the foam which is displaced away from the surface being embossed.

Utilizing this invention, in conjunction with shallow embossing rolls having a greater area of surface embossing, mechanical embossing capabilities with controllable embossing depths and visual end products on foamed structures are enhanced considerably over that found in prior art. In addition, the combination of back wetting and drum cooling permits increased production capacities as well as provides for multilevel embossing of thick foam products.

BRIEF DESCRIPTION OF THE DRAWING

The FIGURE of the drawing is a schematic showing of the process for carrying out the invention herein.

DESCRIPTION OF THE PREFERRED EMBODIMENTS

The invention herein is an alternate process for the manufacturing of the product of U.S. Pat. No. 3,741,851. In the above-mentioned patent, the oven 18 shown in FIG. 2 serves to fuse the resin materials and decompose the blowing agent uniformly throughout the area of the product. Thereafter, the web is passed while still hot, for instance while at a temperature of from about 225° F. to about 325° F., to an embossing structure. The invention herein deals with the passing of that web in U.S. Patent No. 3,741,851 from oven 18 to the inventive structure of the drawing of this disclosure.

The warm web 2, which would move from the oven structure, passes around a conventional guider structure 4, which simply maintains the registry of the printed pattern on the web with the embossing roll pattern in a direction transverse to the direction of web movement. The guider structure is composed of two guide rolls 6 and 8. The back of the web will pass over roll 6 and then the web will pass under roll 8 with the roll surface in contact with the surface of the web to be embossed. This surface will be quite warm and, therefore, roller 8 should be covered with a "Teflon TM" coating to prevent sticking of the upper embossable surface of the web against the surface of the roll 8. This roll 8 is usually maintained at a surface temperature of 200° F. to 250° F. in order to maintain a hot embossable surface. The assembly 4 is a commercially available "Kamberoller TM" which involves two angled guide rolls on a carriage mounted for transverse movement. The transverse guiding of the sheet is carried out through the use of the "Kamberoller TM", but could equally well be carried out by simply the use of guide bars which are placed along the edge of the web and would guide the web edge, and therefore pattern edge, relative to the embossing roll farther down the processing line.

The web then passes over a back wetting structure 10 which is preferably a felt-covered roller 12 partially immersed in a bath of liquid 14. The felt-covered roller 12 of the back wetting structure 10 could be replaced with a steel roller, or even a water spray system. The back wetting structure applies water to the backside, the area of the web not to be embossed, so as to cool the backside and stabilize the hot thermoplastic foam next to the backside of the web. The application of the water and its evaporation from the backside of the web cools the backside of the web and its adjacent foam layer to 125° F. to 200° F. by the time the web enters the embossing apparatus. The rate of water application is governed by the quantity of heat to be removed from the hot thermoplastic foam next to the backside of the web to keep the printed foam from distorting and blistering at the embossing nip. Meanwhile, the upper surface, the embossable surface, of the web is at about 215° F. to 300° F. Under some circumstances, a "Teflon TM" coated roll 16 may be utilized to provide additional heat to the top surface of the web to compensate for heat loss which may occur as the web is moving through ambient air from the oven towards the embossing structure.

The embossing structure will be composed of a back-up roll 20 and an embossing roll which may be the embossing roll 22 positioned as shown in the drawing.

In this situation, the web is embossed almost as soon as it comes in contact with the steel back-up roll 20. Under some circumstances, it may be desirable to move the embossing roll to the position 24 shown in the drawing. Under this set of circumstances, the web will be partially wrapped around the steel back-up roll before the embossing is carried out by embossing roll 24. When embossing roll 24 is used in lieu of roll 22, the back-up roll 20 will be cooled by chilled water to a surface temperature of about 75° F. to 100° F. and will function to further cool the backside of the web prior to the time that embossing is carried out. Here, steel back-up roll 20 is functioning both as a cooling drum and as a back-up roll for the embossing roll 24. Since back wetting is done prior to embossing, the depth of the embossing roll, as it would be in either position 22 or 24, can be quite shallow. Embossing rolls containing engraved designs as shallow as 10 mils in depth have been used successfully in this invention. Also, a partial wrap of embossing roll 24 may be needed for imparting to the hot wear layer an intricate and multilevel embossing design.

Since there is a need to register the embossing pattern with a printed pattern on the web, there must be control of the embossing roll pattern relative the printed pattern to get registry between the two patterns. This will require registry along the machine direction and this registry along the machine direction or in the direction longitudinally of the sheet movement is maintained in the same manner as set forth in U.S. Pat. No. 3,655,312, column 5, line 53, to column 6, line 43. The technique of U.S. Pat. No. 3,694,634 and U.S. Pat. No. 3,741,851 can be adopted herein for machine direction registry also. Finally, registry in the machine direction can be secured using Model R-500 Digital Control and Model R-425-1 Feathering Drive Control of "Registron ™" Division of Bobst Champlain, Inc. At this point it should be noted that registration controls, both across the machine direction and along the machine direction, are necessary to secure a commercially acceptable product with registration between the embossed pattern and the printed pattern, but such controls are not a part of the invention herein, since they are conventional in the art. The essence of the invention herein is in the utilization of the back wetting with or without a cooled back-up roll for the purpose of cooling the backside of the web and adjacent foam layer while still permitting the embossable surface of the web to be maintained at a temperature such that embossing may be carried out. For foam webs having considerable thicknesses (0.100–0.120 inches) and which retain their internal heat, it has been found that an additional back wetting structure 10 is needed and will be positioned prior to the conventional guider structure 4 in order to permit embossing of these webs without blistering. Should the material of U.S. Pat. No. 3,741,851 be utilized through the apparatus generally described above, and no back wetting or cooling be carried out, it has been found that the web will enter the embossing roll nip with a surface temperature on the embossing surface of 220° F. and a temperature on the back of the web, the nonembossed surface, of about 270° F. Under these conditions, the center of the foam of the web will be measured at about 300° F. and this is an ideal situation for blistering within the foam layer. Blistering provides an unacceptable product. It should be noted that the embossing rolls of U.S. Pat. No. 3,741,851 have "bottomless" embossing roll valleys and, therefore, do not emboss the web except with the embossing roll land areas. In the embossing roll structure 22 or 24 herein both the roll land and valley areas make contact and emboss the web. This increased area of embossing is a capability of the structure herein and is not possible in the structure of U.S. Pat. No. 3,741,851. Also, in the structure of U.S. Pat. No. 3,741,851, the embossing area can only be 25% of the total sheet area whereas in the embossing structure herein the embossing area can go to 80%–90% of the total sheet surface area. Normally, the embossed area covers 30%–90% of the total sheet surface area. In operation, the embossing rolls, either roll 22 or 24, would be maintained cold at about 75° F. to 100° F. to freeze in the desired pattern which is being embossed in the web, even partially wrapping roll 24 if necessary to achieve the desired pattern effect.

The material described in U.S. Pat. No. 3,741,851 could come from the oven 18 of that patent and pass through appropriate guiding structures and by back wetter 10 and directly to back-up roll 20 and embossing roll 22, and can be embossed without any blistering in the end product, with very good registration between the embossed pattern and the printed pattern web, and with embossing carried out so that there is bottoming out of the embossing roll against the embossed surface of the web. Cooling of the back surface of the web prior to embossing directly attributes to the lack of blistering and the ability to carry out a "bottoming out" of the embossing roll while still maintaining registration.

Even though this invention can provide for unique embossed designs on wear layers composed of vinyl formulations as described in U.S. Pat. No. 3,741,851, the embossing of additional non-vinyl wear layers is possible. For example, it is also possible to emboss a cured thermoset wear layer web which has a foam underlayer. This particular product will be made by placing a plastisol on a carrier web such as that disclosed in U.S. Pat. No. 2,759,813. The following plastisol is prepared by thoroughly mixing the following ingredients:

| Ingredients | Parts by Weight |
|---|---|
| Poly(vinyl chloride) | 100 |
| Dioctyl Phthalate (Plasticizer) | 49.55 |
| Octyl Epoxy Tallate (Stabilizer) | 5.0 |
| Titanium Dioxide | 3.6 |
| Azodicarbonamide (Blowing Agent) | 2.3 |
| Talc | 0.6 |
| Zinc Octoate (Blowing Agent Activator) | 1.95 |

This above plastisol is applied to the above-described carrier which is a coated beater-saturated asbestos sheet having a thickness of about 0.028 inches. The plastisol is applied with a reverse roll coater to a wet thickness of 10 mils. The plastisol-coated backing is gelled in a hot-air oven for one minute to an exit temperature of 270° F.

This sheet is then cooled and a printed design in placed thereon. The printed design may be of any particular pattern and could be of the same pattern shown in FIG. 3 of U.S. Pat. No. 3,741,851. Inks are prepared by thoroughly mixing the following ingredients:

| Ingredients | Parts by Weight |
|---|---|
| Vinyl Binder | 33.0 |
| Pigment | 12.8 |
| Cellosolve Acetate | 1.6 |
| 2-Nitropropane | 50.0 |
| Isopropyl Acetate | 1.0 |
| Alkyl alcohol aryl polyether | 1.0 |

Inks of various colors based upon the above formula are applied to the gelled plastisol sheet described above utilizing the printing cylinders of a conventional rotogravure printing press. The printing cylinders are run in a normal manner producing the design that is printed in-register. The inks are dried by subjecting the printed sheet to warm air impingement supplied by the enclosed drying zones of the press. The inks are not critical to the invention herein, but simply need be inks which are capable of adhering to and drying on the plastisol abovedescribed.

To the printed gelled plastisol above is applied a plastisol layer having the following formula:

| Ingredients | Parts by Weight |
|---|---|
| Poly(vinyl chloride) | 100 |
| Dioctyl Phthalate (Plasticizer) | 12 |
| 2,2,4-Trimethyl-1,3-Pentadiol Monoisobutyrate, Nuoplaz 1046, Nuodex Inc. (Nonstaining Plasticizer) | 27 |
| Barium-Cadmium-Zinc Phosphite (Stabilizer) | 3 |
| 2,2,4-Trimethyl-1,3-Pentadiol Diisobutyrate | 5 |
| Optical Brightener | 0.005 |

The above plastisol was applied to the printed sheet as a wet film with a thickness of 8.5 mils. It is fused by being heated at 325° F. in a hot-air impingement oven for 2 minutes. This heating step will result in partial blowing of the azodicarbonamide blowing agent in the gelled first coat.

To this last applied fused plastisol there is applied a clear 2 mil (dry) coating of a curable polyurethane. The polyurethane coating is a 55:45 xylene/resin solution containing catalyst. Heat is applied and the polyurethane coating is cured in three minutes' time. The heat applied will complete the decomposition of the blowing agent in the gelled first coat to convert it to a foamed layer, and, will also cure the polyurethane coating. Heat is applied by passing the web through a three-stage oven which has the first stage heated to 270° F., second stage heated to 380° F, and third stage heated to 340° F. The last coating applied is the wear layer surface of the resulting floor product which will be formed. Polyurethane coatings are applied to secure a product which will retain a hard, high gloss surface and eliminate the need for subsequent waxing by the user of the floor. Again, criticality does not particularly rest in the wear layer coating. It is necessary only that the coating be embossable when heated to a range of about 250° F. to 350° F. The invention is particularly applicable to a structure which constitutes a wear layer having thereunder a foam layer, and, it is desirable to emboss the wear layer without having too much heat retained in the foam layer so that the stability of the printed sheet is damaged during embossing in registry with the printed pattern.

The above-described polyurethane coated sheet would be conveyed from the oven, wherein the polyurethane is cured and the foam is expanded, and directed towards the apparatus shown in the drawing herein. Coming from the oven, the above-described composite web composed of the backing sheet, the foam layer, the vinyl layer and the polyurethane coating would be at about 270° F. and would constitute web 2 of the drawing. The web 2 would move past appropriate across-machine and along-machine guide structures towards back wetting structure 10. Because a polyurethane wear surface will tend to lose heat a lot faster than a conventional vinyl wear surface, roll 16 may be provided to engage the upper surface of the web, the polyurethane wear surface. The roll 16 would be heated to 200° F. to 250° F. to help maintain the temperature of the polyurethane wear surface to at least this level. The web would then pass to the back-up roll 20 and embossing roll 22 and would be embossed. The embossing roll would be maintained at about 75° F. surface temperature and the back-up roll would also be maintained at about 75° F. to 100° F. surface temperature. The product, as it passes between the nip of the embossing roll, which is the area between roll 22 and roll 20, will have the polyurethane wear layer, or the top surface of the web 2, at a temperature of about 250° F. The back wetting will have cooled the temperature of the backing or carrier and the back of the foam layer adjacent thereto to a temperature of about 150° F. to 200° F. The cold embossing rolls will immediately freeze the desired embossed pattern into the polyurethane wear layer at the time the embossing is carried out. The thickness of the web described above will be about 70 mils. The embossing pattern on the embossing roll comprises 55%–60% of the total roll surface and the depth of the pattern on the roll is about 60 mils. Full embossing is carried out with both the land areas and valley areas engaging the web surface. Due to spring-back in the material, the end product has an embossed depth of 15 mils. The foam layer in the valley embossed areas will be somewhat compressed as compared to the foam in the unembossed areas.

It has been found that with conventional poly(vinyl chloride) wear layers and foams, such as those disclosed in U.S. Pat. No. 3,741,851, it may be desirable to move the web partially around the back-up roll 20 and position the embossing roll at the point of embossing roll 24. Under this set of circumstances at the time of embossing, the wear layer will be at about 250° F. while the backside of the foam adjacent the carrier or backing will be at about 125° F. to 150° F. The wrapping of the web around the cooled back-up roll 20 will provide this increased reduction in the temperature of the back of the web as well as prevent slippage of the sheet during machine direction registration of the embossing roll to the printed pattern. Those embossing rolls having considerable detail would require that roll 24 be partially wrapped to achieve the desired pattern effect.

What is claimed is:

1. In a process for embossing a web of material wherein said material is composed of a composite structure having a carrier, a non-foamed embossable wear layer and a foamed layer therebetween, said foamed layer on the surface thereof adjacent the wear layer having a decorative pattern printed thereon, said above composite structure being in the form of a web which is first heated to a temperature of about 250° F. to 350° F., the improvement comprising:
   a. then after heating, wetting the carrier of the web, which is the back surface of the web, so as to lower the temperature of the back surface of the foam and the backing approximately 100° below the temperature of the top surface of the web, which is the non-foamed embossable layer,
   b. embossing the top surface of the web wherein the embossing means and its resulting embossing deeply penetrate the web, both the land areas and valley areas of the embossing means contact and impress a pattern on the top surface of the web, and
   c. cooling the embossed surface of the web to set the embossed pattern in the web.

2. The process of claim 1 wherein there is the further step of:
   a. controlling the registry of the embossed pattern with the printed pattern of the web so that the two patterns will be in registry.

3. The process of claim 1 wherein:
   a. a heating means applies heat to the embossable top surface of the web just prior to the time the embossing step is carried out.

4. The process of claim 1 wherein:
   a. the web of material, after back wetting, is passed partly around a cooled drum which engages the carrier or back surface of the web to cool said surface of the web prior to the time that the embossing step is carried out.

5. The process of claim 1 wherein:
   a. the embossing step is carried out with a cold embossing roll and the web of material is wrapped partially around the roll.

* * * * *